United States Patent [19]

Kobierecki et al.

[11] 4,099,852

[45] Jul. 11, 1978

[54] LENS POSITIONER WITH FIVE DEGREES OF FREEDOM

[75] Inventors: Marian W. Kobierecki; Frederick Rienecker, Jr., both of Livermore, Calif.

[73] Assignee: The United States of America as represented by the United States Department of Energy, Washington, D.C.

[21] Appl. No.: 729,632

[22] Filed: Oct. 5, 1976

[51] Int. Cl.² ............................ G02B 7/02; G02B 7/08
[52] U.S. Cl. .................................... 350/247; 350/252; 350/255
[58] Field of Search ........ 350/247, 252, 255, 115–116; 240/151; 354/286; 353/101; 343/757, 765, 882

[56] References Cited

U.S. PATENT DOCUMENTS

| 3,215,391 | 11/1965 | Storm | 343/765 |
| 3,511,462 | 5/1970 | De Bazignan | 350/252 |

FOREIGN PATENT DOCUMENTS

| 63,545 | 5/1945 | Denmark | 350/252 |

*Primary Examiner*—John K. Corbin
*Assistant Examiner*—Wm. H. Punter
*Attorney, Agent, or Firm*—Dean E. Carlson; John A. Koch

[57] ABSTRACT

A device for positioning lenses precisely with five degrees of freedom (three translations and two angular rotations). The unique features of the device are its compact design, large clear aperture, and high degree of positioning accuracy combined with five degrees of freedom in axis motion. Thus, the device provides precision and flexibility in positioning of optical components.

1 Claim, 10 Drawing Figures

LENS POSITIONER WITH FIVE DEGREES OF FREEDOM

BACKGROUND OF THE INVENTION

The invention described herein was made in the course of, or under, Contract No. AT(29-1)-1183, with the United States Energy Research and Development Administration.

With the advent of the laser fusion development effort, substantial effort has been directed to optical systems for efficient handling of the laser light. Under the present laser fusion development efforts, fusion fuel containing pellets are imploded in vacuum chambers by laser light energy directed onto the pellets via optical components. Thus, precision and flexibility in positioning of optical components is essential to these efforts which application requires physical and performance characteristics beyond the capabilities of the large and bulky optical component positioners which are known in the prior art. Thus, a need has existed for positioners having the capability for use in applications requiring precision and flexibility in the remote positioning of optical components in electro-optical systems operating in extreme environments.

SUMMARY OF THE INVENTION

The present invention provides a device for positioning optical, electrical, and mechanical components with the precision and flexibility required for laser fusion or other development applications, by providing for positioning accuracy of lenses, for example, combined with five degrees of freedom in axis motion. These five degrees of freedom in axis motion consist of three translations (X, Y, Z) and two angular rotations ($\alpha$, $\beta$), while being incorporated in a device of compact design, a large clear aperture, and a high degree of positioning accuracy.

Therefore, it is an object of this invention to provide a device for positioning optical components.

A further object of the invention is to provide a lens positioner having precision and flexibility.

Another object of the invention is to provide a lens positioner for positioning lenses precisely with five degrees of freedom.

Another object of the invention is to provide a lens positioner having five degrees of freedom in the axis motions, while providing a compact design, large clear aperture, and a high degree of positioning accuracy.

Another object of the invention is to provide a device for positioning lenses precisely with five degrees of freedom in axis motion (three translations and two angular rotations).

Other objects of the invention will become readily apparent to those skilled in the art from the following description and accompanying drawings.

DESCRIPTION OF THE INVENTION

The present invention comprises a device for positioning lenses precisely with five degrees of freedom (three translations and two angular rotations) as follows:

| Axis | Motions | Range |
|---|---|---|
| Translations | X, Y, Z | ±7 mm |
| Angular Rotations | $\alpha$ $\beta$ | ±3° |

The axis motions, as described in greater detail hereinafter, can be actuated by standard micrometer heads or by motorized linear actuators, which can, for example, take single 0.25 $\mu$m steps and can be operated remotely with integrated sensors for position feedback. The embodiment illustrated in FIGS. 1-10, for example, has a clear aperture of 92 mm, and each axis motion is spring-loaded and free of backlash, permitting the unit to function properly when mounted in any position.

As pointed out above, the lens positioner was designed for remotely positioning lenses to focus laser beams in vacuum chambers to implode fusion fuel targets located in such chambers. The unique features of the lens positoner of this invention are its compact design, large clear aperture, and high degree of positioning accuracy combined with five degrees of freedom in axis motion.

The lens positioner broadly consists of three stages (X, Y, and Base) mounted on precision miniature ball or roller slides which provides the X and Y translations. The Y stage serves as a mount for three actuators (micrometers or motorized linear actuators) that control axis motion. A ring supported by three torsion bars and attached to the ends of the three motion actuators serves as the mount for the beam focusing lens. To provide the Z translation, the three motion actuators are simultaneously moved in and out. To provide the angular rotation $\alpha$, two opposite motion actuators are held fixed while the third actuator is moved in and out. To provide the angular rotation $\beta$, the third motion actuator is held fixed while the two opposite actuators are alternately moved in and out.

The majority of the component parts of the lens positioner are made of stainless steel or aluminum and compatible materials so that distortions caused by the different thermal coefficients of expansion are minimized. All translations are precise to 2 $\mu$m within the full range of motion.

Figure 1A:
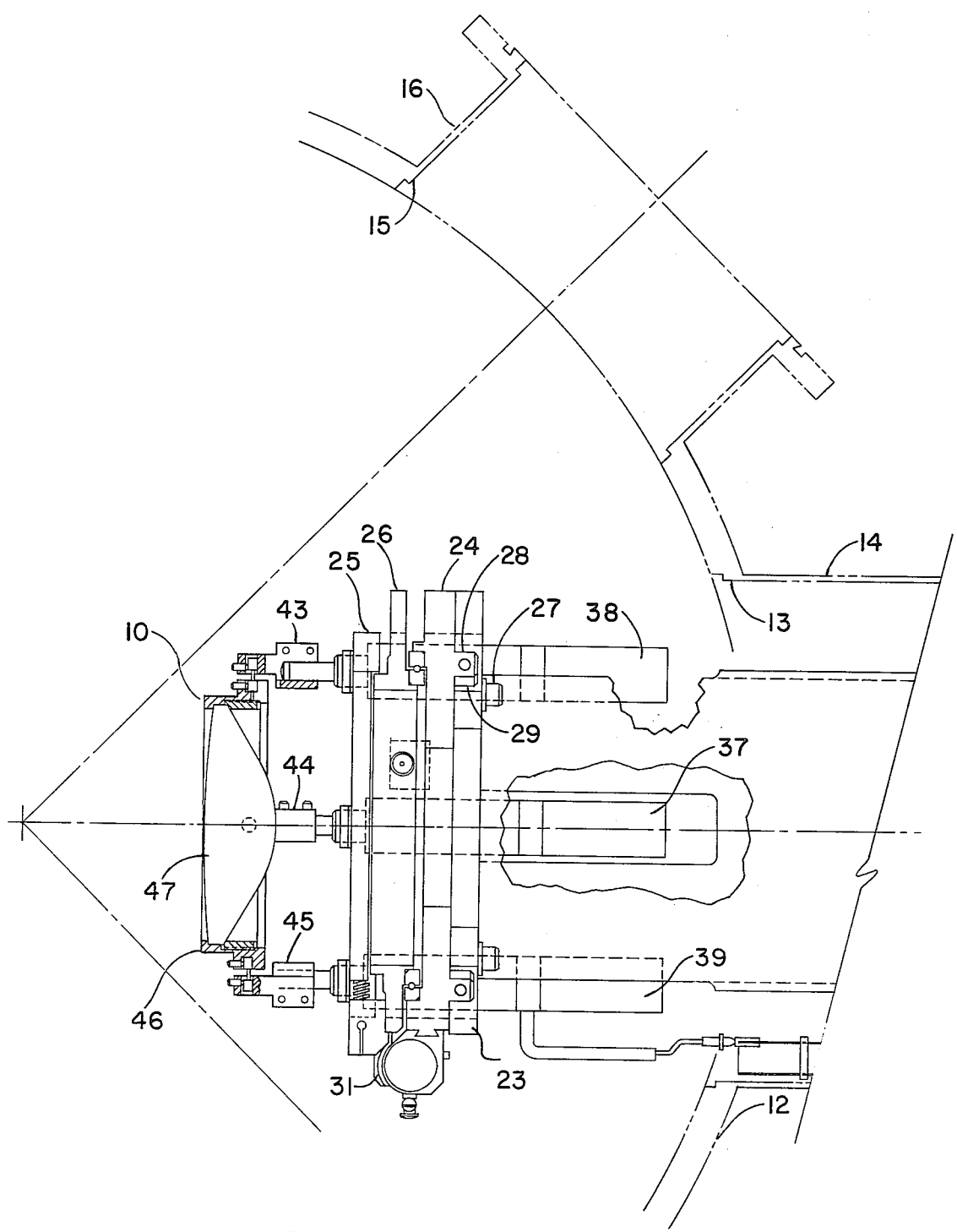
FIGS. 1a and 1b are views, partially in cross section, of an embodiment of a lens positioner assembly, made in accordance with the invention, positioned in a vacuum chamber.
Figure 1B:
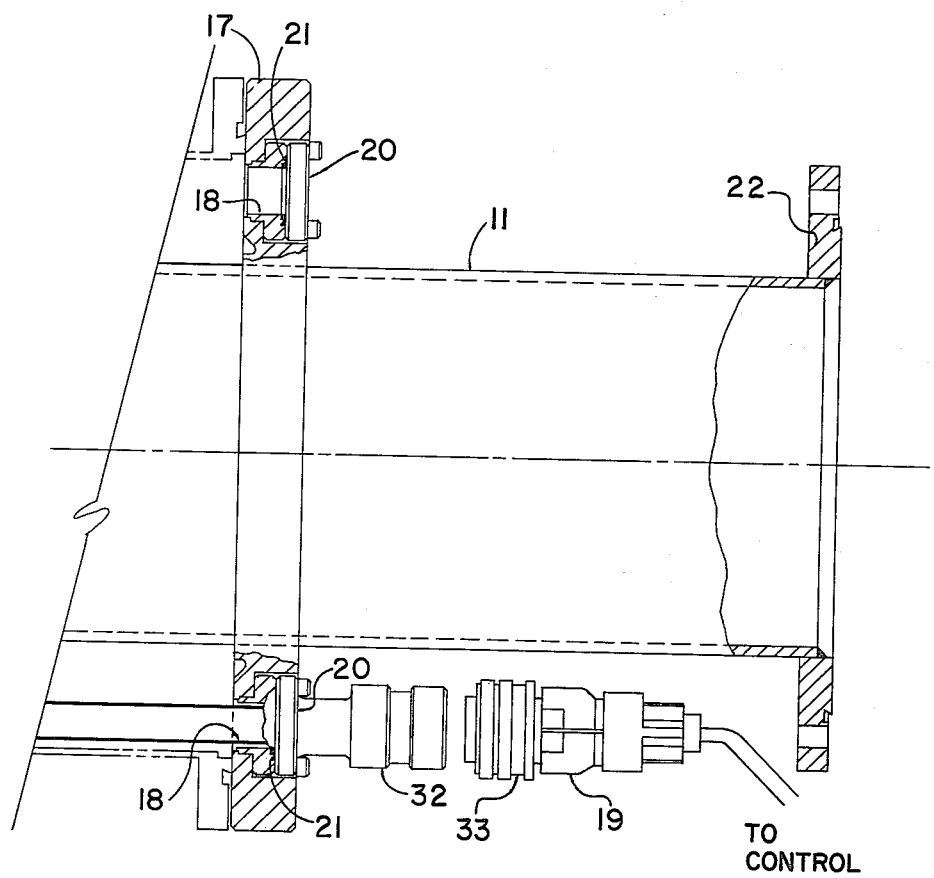
Figure 2:
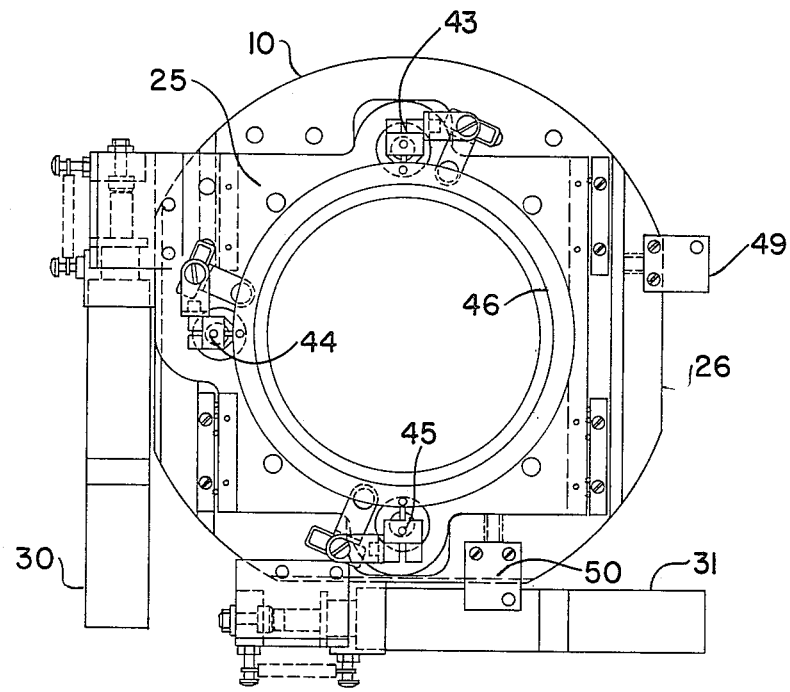
FIG. 2 is an end view of the FIG. 1a assembly.
Figure 3:
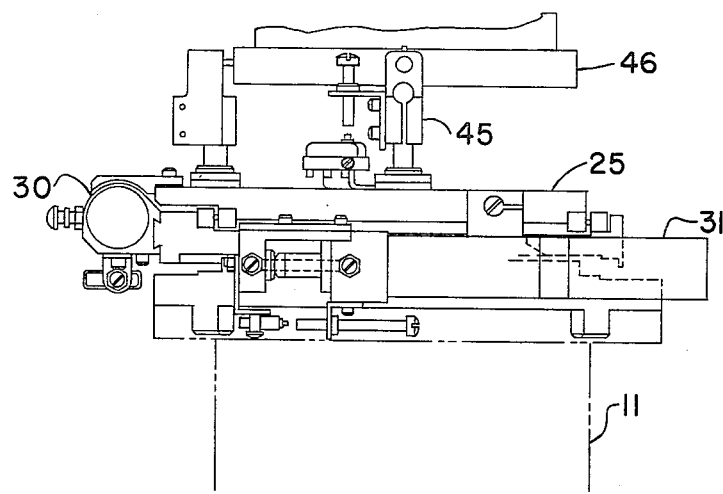
FIG. 3 is a bottom view of FIG. 2.
Figure 4:
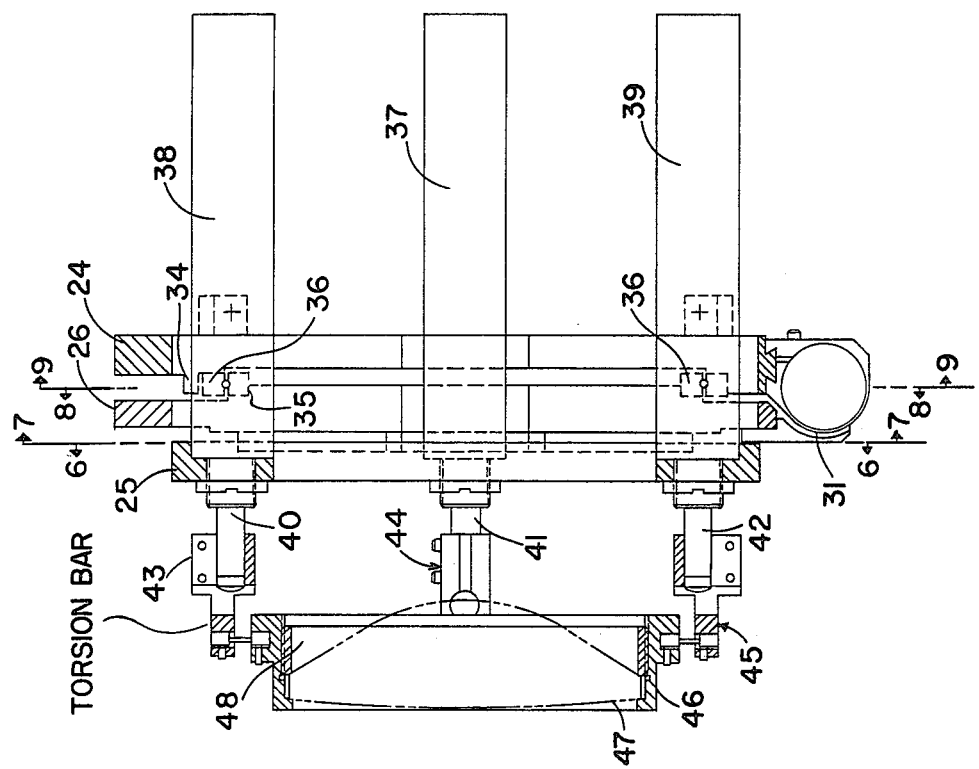
FIG. 4 is a view, partially in cross section, of the positioner subassembly of the FIGS. 1a-1b embodiment.

Referring now to the drawings, an embodiment of a lens positioner assembly is illustrated in FIGS. 1-3. As shown in FIGS. 1a and 1b, the lens positioner assembly is composed of a positioner subassembly, generally indicated at 10, mounted in a support and feed-through spool or sleeve 11 which in turn is secured in a vacuum chamber 12 (only a section of which is shown). In the FIGS. 1a-1b embodiment, for a two-beam laser system, for example, the components 10-11 will be duplicated on the opposite side of vacuum chamber 12, wherein a fusion fuel target is centrally mounted or otherwise passed through the chamber for implosion thereof by laser energy focused through appropriate lens mounted in positioner subassembly 10.

Vacuum chamber 12 is provided in this embodiment with a pair of openings 13 having secured thereabout outwardly extending flanged collar members 14 (only one shown) and a plurality of spaced openings 15 (only one shown) having an outwardly extending flanged collar member 16 secured thereabout, with opening 13 being of greater cross section than opening 15. Support and feed-through spool 11 extends through and is secured in flanged collar member 14 via a flanged section 17 extending thereabout, while flanged collar member 16 is adapted for admitting diagnostic, fuel target injection mechanism, etc., into the chamber 12. Flanged section 17 of spool 11 is provided with a plurality of openings 18 (two in this embodiment) within which electrical feed-through assemblies, indicated generally at 19 (only one shown), are secured. As shown, assemblies 19 are secured in openings 18 by collar or clamp assembly 20 having a seal member 21 located therebehind to maintain the chamber under vacuum conditions. Electrical feed-through assemblies 19 are connected externally of chamber 12 with actuator controllers, as indicated by legend but not shown. Support and feed-through spool 11 is provided at each end with flanged end sections 22 and 23. End section 22 is adapted for connection with apparatus not shown through which laser light, for example, is directed through lens positioner subassembly 10 secured to flanged end section 23.

Lens positioner subassembly 10 (see FIGS. 1 and 4) includes a baseplate assembly 24, a "Y"-stage assembly indicated generally at 25 and an "X"-stage assembly indicated generally at 26, with X-stage assembly 26 located intermediate baseplate assembly 24 and Y-stage assembly 25. Baseplate assembly 24 is secured, as by bolts 27, to flanged end section 23 of support and feed-through spool 11 (see FIG. 1) and includes a plurality of outwardly projecting sections 28 which cooperate with opening 29 in flanged end section 23. A Y translation actuator 30 is connected to Y-stage assembly 25, while an X translation actuator 31 is connected to X-stage assembly 26, each actuator being electrically connected via electrical feed-through assemblies 19 to a remotely located controller. Feed-through assemblies 19 each include disconnectable male and female plugs 32 and 33, for each of the axis motions which are connected to the controllers not shown in this disclosure.

Figure 5:
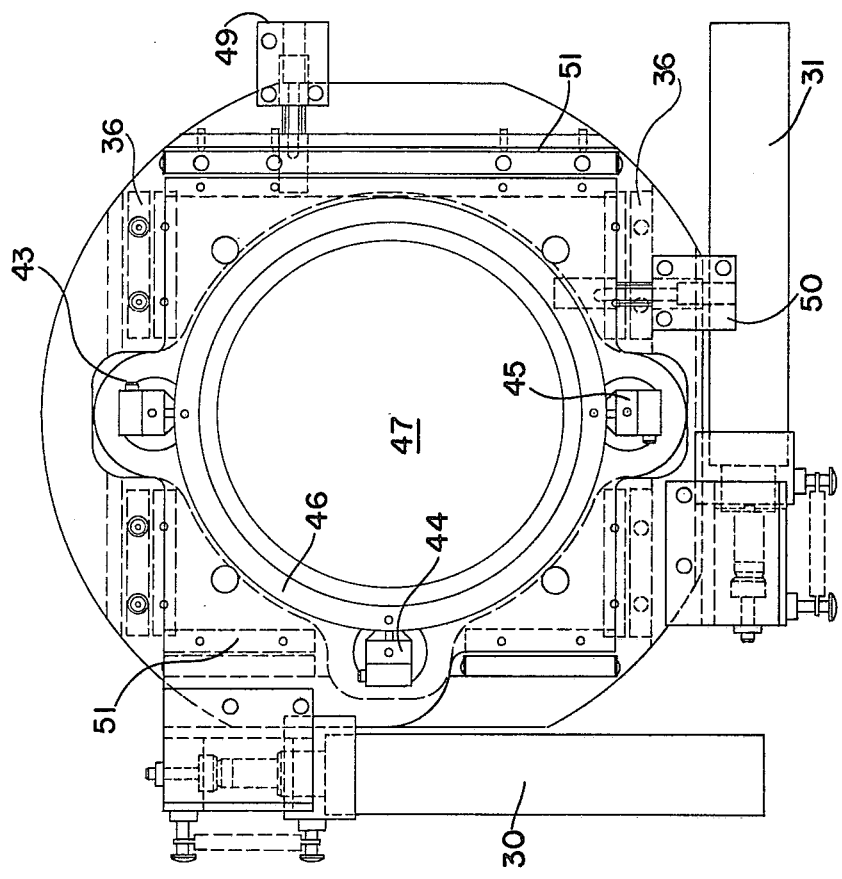
FIG. 5 is an end view of the FIG. 4 subassembly.
Figure 6:
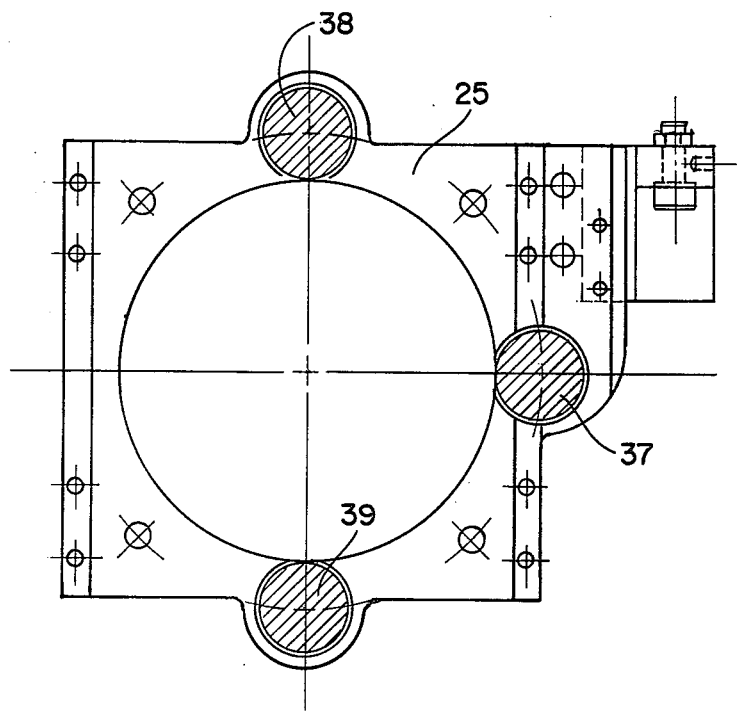
FIG. 6 is a view taken along lines 6—6 of FIG. 4.
Figure 7:
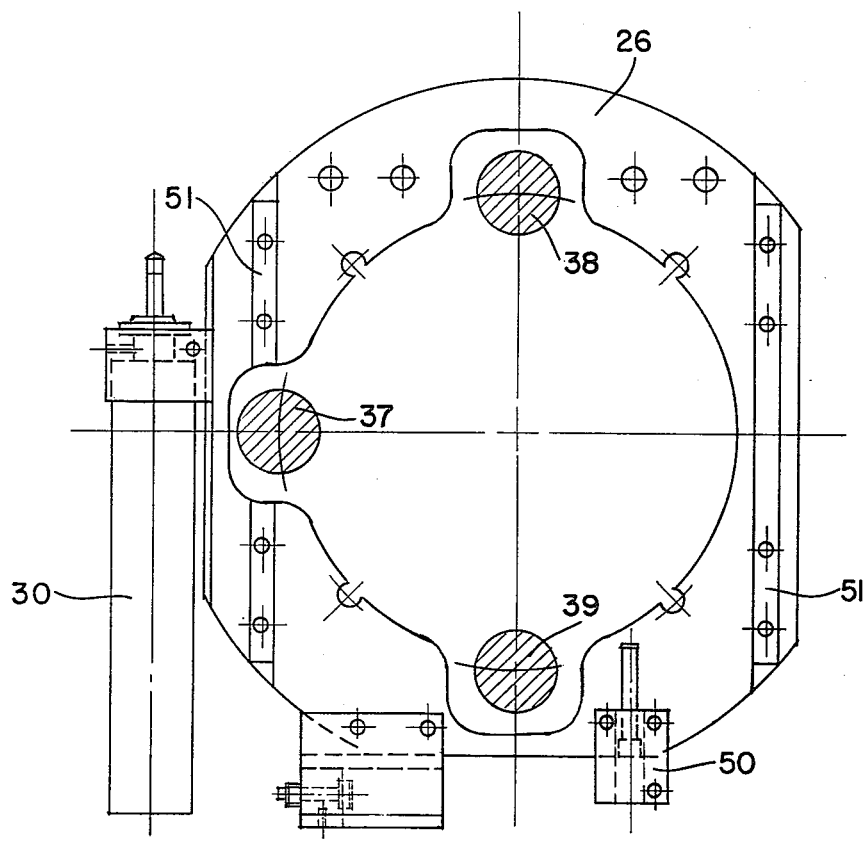
FIG. 7 is a view taken along lines 7—7 of FIG. 4.
Figure 8:
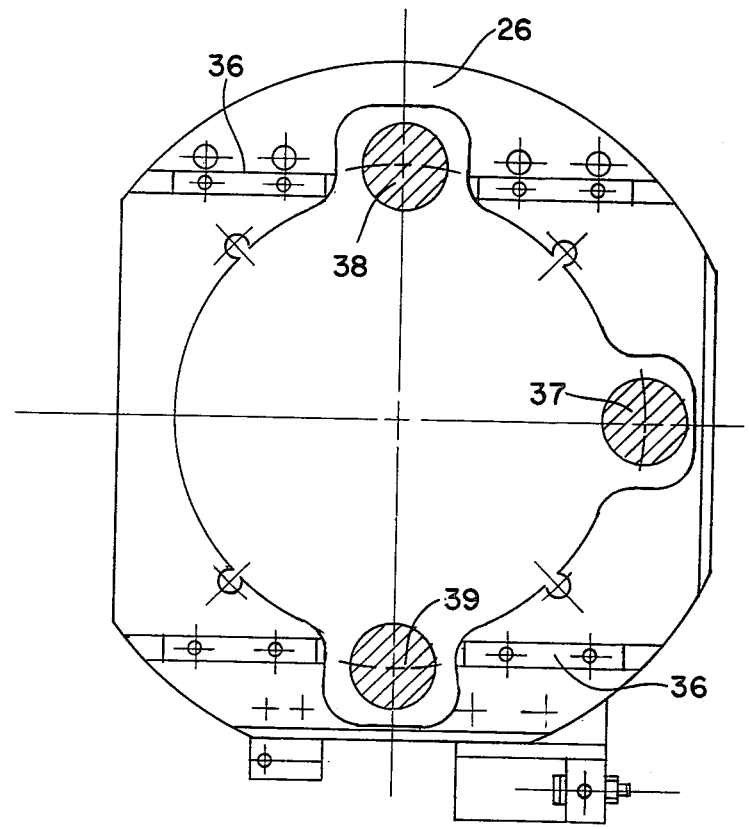
FIG. 8 is a view taken along lines 8—8 of FIG. 4.
Figure 9:
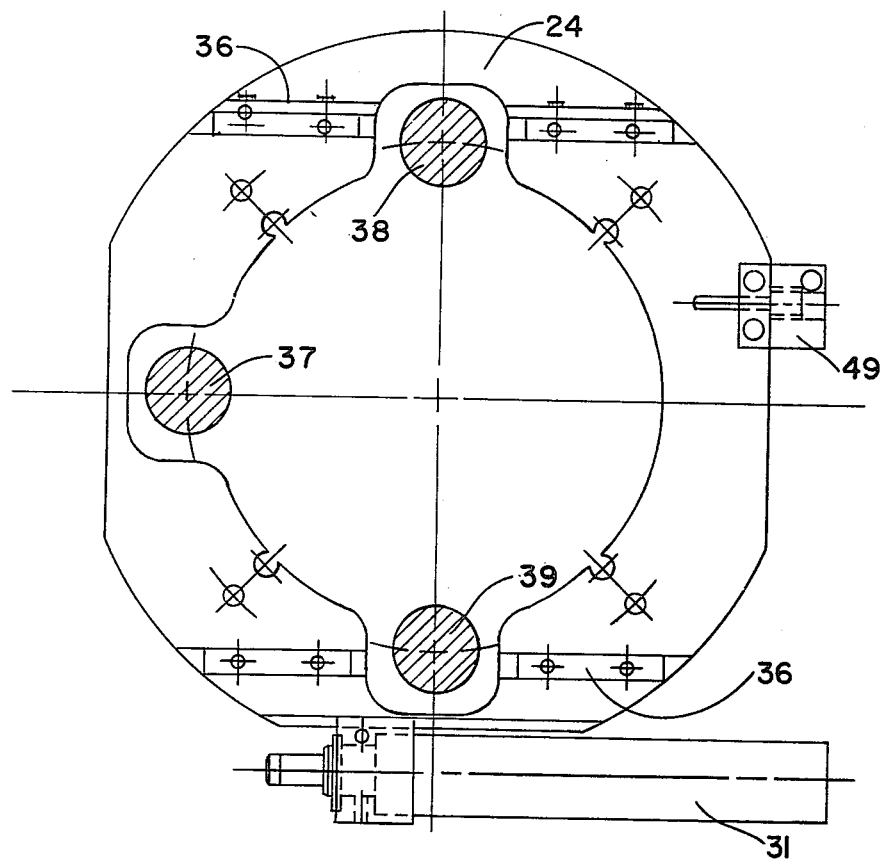
FIG. 9 is a view taken along lines 9—9 of FIG. 4.

Baseplate assembly 24 is provided with a protruding member 34 (see FIG. 4) on the side opposite projecting sections 28, while X-stage assembly 26 is provided with a shoulder 35 between which is located a precision miniature ball or roller slide assemblies 36. Z translation and $\alpha,\beta$ rotation or motion actuators generally indicated at 37, 38, and 39, are secured to Y-stage assembly 25 and connected by rods or members 40, 41, and 42, respectively, via torsion bar assemblies 43, 44, and 45, to a lens ring 46 within which is mounted a lens 47 via a retainer ring 48. Compression spring assemblies 49 and 50 are mounted on baseplate assembly 24 and X-stage assembly 26 to render the device free of backlash. As seen in FIGS. 5–7, precision miniature ball or roller slide assemblies 51, similar to assemblies 36, are located intermediate Y-stage assembly 25 and X-stage assembly 26 positioned in cooperating rails or grooves forming in assemblies 25 and 26.

The Y and X translations are accomplished by the actuation of actuators 30 and 31, respectively, which move the Y-stage assembly 25 and X-stage assembly 26 along the ball or roller slide assemblies 51 and 36. To provide the Z translation, the three motion actuators 37, 38, and 39 are simultaneously activated to move the torsion bar assemblies 43, 44, and 45 in or out. To provide the angular rotation $\alpha$, the two opposite motion actuators, 38 and 39, are held fixed while the third motion actuator 37 is moved in or out. To provide the angular rotation $\beta$, the third motion actuator 37 is held fixed while the two opposite motion actuators, 38 and 39, are alternately moved in or out. While lens retainer ring 46 in this embodiment contains only one lens 47 as illustrated, a plurality of lenses may be positioned in retainer ring 46.

It has thus been shown that the present invention provides a device for positioning lenses precisely with five degrees of freedom (three translations and two angular rotations), thereby substantially advancing to state of the art by providing physical and performance characteristics beyond the capabilities of the prior known lens positioners. The invention is particularly applicable for remotely positioning lenses used to focus laser beams into vacuum chambers for fusion energy development efforts. The invention provides a compact design having a large clear aperture, and high degree of positioning accuracy combined with five degrees of freedom in axis motion.

While a particular embodiment of the invention has been illustrated and described, modifications and changes will become apparent to those skilled in the art, and it is intended to cover in the appended claims all such modifications as come within the spirit and scope of this invention.

What I claim is:

1. A lens positioner for positioning lenses precisely with five degrees of freedom of motion consisting of three translations and two angular rotations in combination with a vacuum chamber and means for supporting same in said vacuum chamber, whereby said lens positioner can be remotely controlled, said lens positioner comprising: a base assembly, an X-stage assembly movably mounted with respect to said base assembly, a Y-stage assembly movably mounted with respect to said X-stage assembly, actuator means for individually moving said X-stage and Y-stage assemblies, three torsion assemblies operatively supported by said Y-stage assembly, actuator means for individually moving said torsion assemblies, and means movably connected to said torsion assemblies for retaining at least one lens, whereby selective activation of said actuator means, produces translations in X, Y, and Z axis motions and angular rotations $\alpha$ and $\beta$ of the lens retaining means; said supporting means comprising a support and feed-through spool operatively mounted in an opening in said vacuum chamber, said support and feed-through spool having flanged end sections, one of said flanged end sections being secured to said base assembly of said lens positioner, the other of said flanged end sections being adapted to be connected to apparatus for directing a light beam through said lens positioner into said vacuum chamber, said support and feed-through spool being additionally provided with means for sealably securing therein an electrical feed-through assembly, said electrical feed-through assembly being operatively connected to said actuators of said lens positioner and to a remotely located actuator controller.

* * * * *